United States Patent Office 3,404,118

Patented Oct. 1, 1968

3,404,118

REACTIVE MODIFIERS FOR THERMOSETTING RESINS

Vernon L. Guyer, Minneapolis, Minn., and Roger H. Kottke, Hatboro, Pa., assignors, by mesne assignments, to Ashland Oil and Refining Company, a corporation of Kentucky No Drawing. Filed Jan. 30, 1964, Ser. No. 341,420
10 Claims. (Cl. 260—30.4)

ABSTRACT OF THE DISCLOSURE

The speed of polymerization in thermosetting foundry binders and increase in their tensile strength with decrease in susceptibility to overcuring are accomplished by addition of tetrahydrofurfuryl glycidyl ether or furfuryl glycidyl ether to such thermosetting resins and thereafter such modified resins are employed in the production of foundry binders and foundry core compositions.

This invention relates to a method of improving thermosetting resins. More particularly, this invention relates to a method of improving certain synthetic thermosetting resins by the addition of reactive modifiers to enhance certain desirable characteristics.

An object of this invention is to provide a reactive modifier for thermosetting synthetic resins. Another object of this invention is to provide a reactive diluent for epoxy resins. A further object of this invention is to provide a reactive modifier particularly suitable for increasing the speed of polymerization in thermosetting synthetic foundry binders. Yet another object of this invention is to provide a reactive modifier for thermosetting synthetic foundry binders which increases the tensile strength. Yet a further object of this invention is to provide a reactive modifier for synthetic foundry binders which decreases their susceptibility to overcuring.

The objects of this invention are accomplished by the process which comprises the addition of tetrahydrofurfuryl glycidyl ether or furfuryl glycidyl ether to thermosetting synthetic resins, especially epoxy resins, aminoplast resins, phenolic resins and furan resins.

The addition of tetrahydrofurfuryl glycidyl ether or furfuryl glycidyl ether greatly enhances several desirable properies of synthetic thermosetting resins. The improvements are most readily noted when tetrahydrofurfuryl glycidyl ether or furfuryl glycidyl ether are added to epoxy resins, aminoplast resins, phenolic resins and furan resins.

Tetrahydrofurfuryl glycidyl ether has the structure:

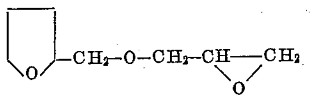

in which the furan ring is saturated. Furfuryl glycidyl ether has the structure:

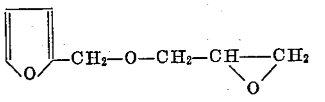

in which the furan ring has two double bonds.

There are several possible methods of synthesizing the reactive modifiers of this invention. The preferred method of obtaining the furan glycidyl ethers proceeds by the equation:

$$R—CH_2—OH + NaH \longrightarrow RCH_2—ONa + H_2\uparrow$$

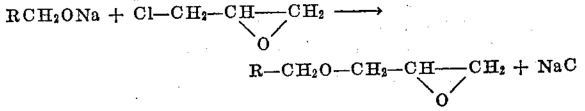

where R is a furan ring or tetrahydrofuran ring. The particular method of producing the desired compound is not critical.

The compound $RCH_2ONa$, shown in the above equation is referred to herein as a sodium oxide salt. Thus, the term sodium oxide salt as used herein means sodium tetrahydrofurfuroxide and sodium furfuroxide.

It is preferable to use sodium hydride to form the sodium oxide salt. Metallic sodium can also be used, but it has been found that when preparing sodium furfuroxide, better yields are obtained by using sodium hydride rather than metallic sodium. It is believed that the better yield is obtained with sodium hydride because it is less likely to attack the double bonds in the furan ring. Also, when using metallic sodium it is necessary to maintain the sodium in a finely divided state.

The reaction between furfuryl alcohol or tetrahydrofurfuryl alcohol with sodium hydride proceeds rapidly and exothermically using equi-molar amounts. If an excess of either reactant is used, it is preferred to use a slight excess of the alcohol.

Since sodium furfuroxide and sodium tetrahydrofurfuroxide are normally solids, the reaction is run in slurry form using an inert solvent. Sufficient solvent is used so that a slurry is maintained through the completion of the sodium reaction. The preferred solvents are inert to sodium attack. They include both aliphatic and aromatic hydrocarbons and ethers, especially tetrahydrofuran, dimethyl sulfoxide, n-heptane, n-hexane, n-octane, cyclohexane, diethyl ether, benzene, xylene, toluene, and the like.

The sodium oxide salt formation is carried out under atmospheric pressure at a temperature between about 40° C. and 100° C., the higher temperature being dependent on the reflux temperature of the mixture.

Having formed the sodium oxide salt, the glycidyl ether is prepared by condensation reaction with epichlorohydrin. While it is preferred to use epichlorohydrin as the epihalohydrin in the preparation of the glycidyl ethers of the present invention, homologues thereof, for example, epibromohydrin and the like also may be used advantageously.

The epihalohydrin condensation reaction is also carried out under atmospheric pressure at a temperature of about 25° C. to 110° C. The higher temperature again being limited by the reflux temperature. Since the reaction is at first exothermic, it is necessary to control the temperature by adding epichlorohydrin gradually over a time interval. It is preferable to use a molar excess of up to 100% epichlorohydrin to insure complete reaction with the sodium furfuroxide.

The glycidyl ethers formed are normally liquid and are soluble in most organic solvents. During the reaction of epichlorohydrin with the sodium oxide salt, a physical change is noted as the reaction mixture changes from a slurry to a true solution. Also, the formation of salt crystals will be noted as the reaction progresses. Upon completion of the epichlorohydrin addition, the reaction temperature is maintained at about 60° C. to 110° C. for about one hour to insure completion of the reaction.

Since an excess of epichlorohydrin is preferred in carrying out the reaction, it is often desirable to isolate the glycidyl ether from the inert solvent and the excess epichlorohydrin. The isolation is readily carried out by stripping under vacuum. The excess epichlorohydrin and solvent are separated during the distillation for subsequent reuse.

The prepared tetrahydrofurfuryl glycidyl ether and furfuryl glycidyl ether are particularly useful as reactive diluents for epoxy resins. As reactive diluents, they perform the dual function of first acting as a solvent so as to provide a less viscous resin composition and secondly, functioning as a polymerizable monomer. By using tetrahydrofurfuryl glycidyl ether and furfuryl glycidyl ether as modifiers, varying degrees of hardness, flexibility, and rigidity are incorporated into epoxy resins. Without such a modifier, cured epoxy resins often do not have the required properties for many uses. The addition of the modifiers of this invention decreases the viscosity of the uncured resin and increases the rigidity of the cured epoxy resin.

When used with epoxy resins, the amount required is dependent on the viscosity desired and the cured properties desired. With increasing percentages of the glycidyl ethers of this invention, lower resin viscosities are obtained and when used with supporting fibers a more rigid final cure results.

Normally it is preferred to use 2% to about 30% furfuryl glycidyl ether or tetrahydroglycidyl ether by weight of the epoxy resin. Such amounts are sufficient to dilute epoxy resins to a wide variety of consistencies and cured properties.

The term "epoxy resin" as used herein is meant to describe the reaction products of an epihalohydrogen and a compound selected from the group consisting of dihydric phenol and the condensation product of an aldehyde and a mononuclear monohydric alkyl phenol. These resins are cured to a hardened state in the presence of a hydrocarbon amine, an acid or an acid anhydride.

The resinous epoxy compositions preferred in this invention may be prepared by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxide groups per molecule. Polynuclear phenols which have been found to be particularly suitable include those wherein the phenol nuclei are joined by carbon bridges, such for example as 4,4'-dihydroxy-diphenyl - dimethyl - methane, often referred to as bis-phenol A, 4,4'-dihydroxy-diphenyl-methyl-methane and 4,4'-dihydroxy-diphenylmethane, often referred to as bis-phenol F. In admixture with the named polynuclear phenols, use also may be made of those polynuclear phenols wherein the phenolic nuclei are joined by sulfur bridges, such for example as 4,4'-dihydroxy-diphenyl-sulfone. Polyhydric alcohols are glycerol, glycol, propylene glycol and 1,5-pentanediol.

While it is preferred to use epichlorohydrin as the epihalohydrin in the preparation of the resinous polymeric epoxide starting material of the present invention, homologues thereof, for example, epibromohydrin and the like also may be used advantageously.

The product of the reaction, instead of being a single simple compound, is generally a complex mixture of glycidyl polyethers, but the principal product may be represented by the formula:

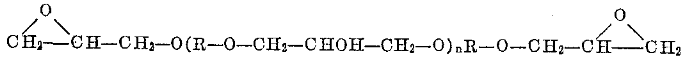

wherein $n$ is an integer of the series 0, 1, 2, 3, and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is substance primarily of the above formula, it may contain some material with one or both of the terminal glycidyl radicals in hydrated form.

The resinous polymeric epoxide, or glycidyl polyether of a dihydric phenol preferred in this invention has a 1,2-epoxy equivalency greater than 1.0. By epoxy equivalence, reference is made to the average number of 1,2-epoxide groups:

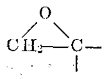

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases, it is a value greater than 1.0. The 1,2-epoxy equivalency of the polyethers is thus a value between 1.0 and 2.0.

Epoxy resins of these types are sold under the trade name "Epon" and are well known as "Epon resins."

The invention will be better understood with reference to the following examples which are illustrations of certain preferred embodiments of the present invention. Unless otherwise indicated, all parts and percentages used herein are by weight.

EXAMPLE I

Furfuryl glycidyl ether and tetrahydrofurfuryl glycidyl ethers were evaluated as diluents for epoxy resins. As a comparison, phenylglycidyl ether was used as a control. Epon 828, a bis-phenol-A glycidyl ether composition, sold by Shell Oil was the epoxy resin used in this test.

Mixtures of Epon 828 were prepared each containing 10% either furfuryl glycidyl ether, tetrahydrofurfuryl glycidyl ether, or phenyl-glycidyl ether. After thoroughly mixing, the viscosity was measured at 25° C. Table I shows the viscosity obtained for each of the diluents.

TABLE I

| Diluent | Percent diluent | Viscosity in stokes |
|---|---|---|
| Furfurylglycidyl ether | 10 | 15.3 |
| Tetrahydrofurfurylglycidyl ether | 10 | 25.0 |
| Phenyl glycidyl ether | 10 | 22.9 |

Unexpectedly, when furfurylglycidyl ether and tetrahydrofurfurylglycidyl ether are used as diluents for epoxy resins and cured with reinforcing fibers, much more rigidity is imparted to the fiber than when the usual diluents like phenyl glycidyl ether are used. Such a result is particularly useful in forming laminates of resin and fiber for use as structural members.

As Table I indicates, lower viscosities are also obtained when using the glycidyl ethers of this invention. Such an improvement permits easier wetting of the fibers.

The curing of the epoxy resins diluted with the glycidyl ethers of this invention is accomplished under both acidic and basic conditions. The acidic conditions may be produced by either a co-reactant such as chlorendic anhydride and oxalic acid, or a catalyst such as boron trifluoride. Basic cures are normally effected by a co-reactant such as a polyamine, a polyamide or a fatty modified polyamine.

The use of tetrahydrofurfuryl glycidyl ether and furfuryl glycidyl ether as a modifier for aminoplast, furan and phenolic resins is particularly applicable to the foundry binder art. When used with thermosetting synthetic foundry binders in an amount of 2% to about 30% by weight of the binder, an increase in the polymerization speed is noted in addition to an increase in the tensile strength of the cured product. Surprisingly, a marked reduction in tendencies to overcure is also noted.

Foundry sand mixes are normally mixtures of an aggregate material such as sand and a polymerizable binder.

The binder portion of the sand mix is a relatively minor constituent, generally in the range of about 0.5% to about 5% binder based on the weight of the sand. Most often, the binder content does not exceed more than about 2% by weight of the sand. In addition to a polymerizable binder, the sand mix requires a polymerization agent such as a catalyst, a co-reactant or initiator for the precursor of a thermosetting resin. The polymerization agent is normally used in an amount equal to about 10% to about 30% based on the weight of thermosetting resin.

A preferred foundry sand mix is subjected to conditions which cause its cure to a hardened infusible state after it has been molded into a desired shape. The methods and conditions required to polymerize thermosetting resin-sand mixes are dependent upon the polymerization agent used and the type of resin. Broadly stated, the methods used can be classified as a "room temperature cure" and an "elevated temperature cure." The furan glycidyl ethers of the present invention are useful modifiers for both systems.

The term "room temperature cure" is used to indicate a curing by chemical reaction without external heating means. Normally, this takes place at a temperature of about 60° F. to about 85° F. Such binder systems would also cure at temperatures ranging from about 45° F. to 500° F. but are distinguished because of their capability of curing without external heating.

The term "elevated temperature curing" means initiating the cure by subjection to heat. Such binders are often termed "hot box binders," because they are capable of being cured rapidly in a heated pattern at temperatures of about 225° F. to about 500° F. In addition, cores made with these binders may be cured by baking at similar temperatures.

The thermosetting synthetic resins preferably modified with the glycidyl ethers of this invention are aminoplast resins, such as urea-formaldehyde resins, melamine formaldehyde resins, furan resins such as furfuryl alcohol resins, furfuryl alcohol formaldehyde resins, urea-formaldehyde-furfuryl alcohol resins, and phenolic resins such as phenol-formaldehyde resins, phenol-formaldehyde-urea resins, and phenol-formaldehyde-furfuryl-alcohol resins.

There are many variations in these resins and the methods of producing them. Examples of some of the many variations of urea-formaldehyde resins and furfuryl alcohol modified resins have been described in the patent art. Harvey in U.S. 2,343,972 described the condensation of furfuryl alcohol and formaldehlyde. Brown et al., in U.S. 3,020,609 describes sand mixes containing monomeric furfuryl alcohol catalyst mixtures. Dunn et al., in U.S. 3,059,297 describes a urea-formaldehyde-furfuryl alcohol resin. Freeman et al., in Canadian Patent 573,760 describes several furfuryl alcohol resins. British Patent 920,236 describes urea-formaldehyde-furfuryl alcohol resins. There are many other patents and published literature describing similar resins.

The phenolic resins preferred in the processes of this invention are alkali condensates of phenol and formaldehyde. These resins are often modified by an addition of 1% to 30% urea. In addition to a modification with urea, monomeric furfuryl alcohol or polymerized furfuryl alcohol can be added to phenol-formaldehyde resin and reacted therewith. Such an addition normally speeds the final polymerization rate.

Most of the foundry resins described are cured by the addition of acidic polymerization agents. Examples of acidic materials include strong acids and salts of strong acids such as $HCl$, $H_3PO_4$, $H_2SO_4$, $BF_3$, $NH_4Cl$, $AlCl_3$, $FeCl_3$, and the like. An acidic polymerization is especially beneficial when using furfuryl glycidyl ether as a modifier. The acidic conditions favor reaction with both the glycidyl group and the furan ring. Under such conditions, the furfuryl glycidyl ether can polymerize both through the glycidyl group and by reaction with the unsaturated furan ring.

EXAMPLE II

This example illustrates the improvement desired by the addition of furfuryl glycidyl ether and tetrahydrofurfuryl glycidyl ether to a foundry sand binder. The foundry sand binder used was a urea-formaldehyde (UF) resin modified by the addition of 5% furfuryl alcohol (FA). To effect the polymerization to a final cure, a polymerizing agent consisting of 6% ammonium chloride 40% urea, and 54% water was used in an amount equal to 20% by weight of the resin. Sand mixes were prepared by thoroughly mixing sand with 2% resin based on the weight of sand and 20% catalyst based on the weight of resin. Two additional sand mixes were prepared. One mix contained a resin which was a blend of 5% furfuryl glycidyl ether (FGE) and 95% of the same urea-formaldehyde resin. The other sand mix contained a resin which was a blend of 5% tetrahydrofurfuryl glycidyl ether (THFGE) and 95% of the same urea-formaldehyde resin. All of the sand mixes contained a total of 2% resin based on the sand and 20% catalyst based on the resin. Tensile briquettes were prepared by blowing the sand mix into a heated pattern at the temperature indicated in the table for the period of time indicated so as to prepare tensile briquettes according to American Foundrymen's Society Standards as found in Foundry Sand Handbook, 6th edition, 1952, published by The American Foundrymen's Society. Table II shows the results obtained for the various mixes. The figures are given in pounds per square inch.

TABLE II

| Resin binder | 350° F. | | | | 500° F. | | | |
|---|---|---|---|---|---|---|---|---|
| | 10 sec. | 15 sec. | 20 sec. | 30 sec. | 10 sec. | 15 sec. | 20 sec. | 30 sec. |
| 100% UF/FA | 279 | 240 | 237 | 236 | 239 | 201 | 207 | 209 |
| 95% UF/FA+5% FGE | 271 | 293 | 315 | 321 | 321 | 321 | 313 | 320 |
| 95% UF/FA+5% THFGE | 323 | 320 | 336 | 348 | 360 | 376 | 383 | 363 |

It can be noted from the above table that the addition of the glycidyl ethers of this invention produces cores which are considerably stronger than the same resin which does not contain an addition of glycidyl ether. Also, the resin containing the glycidyl ethers of this invention are much more resistant to overbaking during longer curing cycles.

EXAMPLE III

This example illustrates the effect of a 5% addition of tetrahydrofurfuryl glycidyl ether compared to a 5% addition of tetrahydrofurfuryl alcohol to the urea-formaldehyde resin used in Example II. The first resin was prepared by mixing 95% of the urea-formaldehyde resin with 5% tetrahydrofurfuryl alcohol (THFA). The second resin was prepared by mixing 95% of the urea-formaldehyde resin with 5% tetrahydrofurfuryl glycidyl ether (THFGE). Foundry mixes were prepared as in Example II, using Nugent Lake sand and 2% resin based on the weight of the sand and 20% catalyst based on the weight of the resin.

The foundry sand mixes were blown into a heated pattern to form standard American Foundrymen's Society tensile briquettes. The tensile strength of the briquettes was then determined for various curing times. Table III is the result obtained. The figures are in pounds per square inch.

TABLE III

| Resin binder | 350 ° F. | | | 500° F. | | | |
|---|---|---|---|---|---|---|---|
| | 15 sec. | 20 sec. | 30 sec. | 10 sec. | 15 sec. | 20 sec. | 30 sec. |
| 95% UF/FA+5% THFA | 350 | 310 | 290 | 300 | 280 | 270 | 290 |
| 95% UF/FA+5% THFGE | 360 | 420 | 450 | 430 | 440 | 430 | 400 |

It can be noted from the above table, that the resin containing tetrahydrofurfuryl glycidyl ether cures more rapidly to a much higher tensile strength and is not nearly as susceptible to overcuring. This is particularly advantageous when producing cores that have both thick and thin sections. With such a resin as that containing the tetrahydrofurfuryl glycidyl ether modification, the thin sections will not overcure before the thicker sections become cured.

EXAMPLE IV

This example illustrates the effect of furfuryl glycidyl ether on a room temperature curing furan resin. The furan resin was a urea-formaldehyde furfuryl alcohol polymer, composed of 30% urea-formaldehyde and 70% furfuryl alcohol. Foundry sand mixes were prepared using Wedron Sand and 2% resin based on the weight of sand. The catalyst was 20% of 85% phosphoric acid based on the weight of the resin. The furan resin was the binder used in the first sand mix. A second sand mix was made in the same manner with the exception that 10% furfuryl glycidyl ether (FGE) was added to the furan resin. Two percent of this blend based on the weight of sand and 20% of 85% phosphoric acid based on the weight of resin was used as the catalyst in the second foundry sand mix.

Standard American Foundrymen's Society tensile briquettes were prepared and allowed to cure at room temperature. The curing rate was determined by measuring the tensile strength of the prepared briquettes at spaced intervals of time. Table IV shows the result obtained with the two sand mixes. The results are in pounds per square inch.

TABLE IV

| Resin binder | 30 min. | 1 hour | Overnight |
|---|---|---|---|
| 100% Furan | 125 | 164 | 230 |
| 90% Furan +10% FGE | 165 | 203 | 296 |

It can be noted from the above table that the addition of furfuryl glycidyl ether increases the curing speed of the furan resin and the ultimate tensile strength.

The embodiments of the present invention in which an exclusive property or privilege is claimed are defined as follows:

1. A foundry binder composition comprising sand, 0.5% to 5% thermosetting resin, based on the weight of said sand, a polymerization agent for said resin and from about 2% to 30% by weight of said thermosetting resin of a modifying agent comprising a glycidyl ether selected from the group consisting of furfuryl glycidyl ether and tetrahydrofurfuryl glycidyl ether.

2. Claim 1 where the thermosetting resin is an aminoplast resin.

3. Claim 1 where the thermosetting resin is a furan resin.

4. Claim 1 where the thermosetting resin is a phenolic resin.

5. A method of producing foundry cores comprising mixing sand, 0.5% to 5% furan resin based on the weight of sand, 2% to 30% of a glycidyl ether selected from the group consisting of furfuryl glycidyl ether and tetrahydrofurfurylglycidyl ether based on the weight of resin and a polymerizing amount of a polymerization agent for said resin, molding the mixture to the desired shape and causing the cure to a hardened state.

6. A method of producing foundry cores comprising mixing sand, 0.5% to 5% aminoplast resin based on the weight of sand, 2% to 30% of a glycidyl ether selected from the group consisting of furfuryl glycidyl ether and tetrahydrofurfurylglycidyl ether based on the weight of resin and a polymerizing amount of a polymerization agent for said resin, molding the mixture to the desired shape and causing the cure to a hardened state.

7. A method of producing foundry cores comprising mixing sand, 0.5% to 5% phenolic resin based on the weight of sand, 2% to 30% of a glycidyl ether selected from the group consisting of furfurylglycidyl ether and tetrahydrofurfurylglycidyl ether based on the weight of resin and a polymerizing amount of a polmerization agent for said resin, molding the mixture to the desired shape and causing the cure to a hardened state.

8. A foundry core obtained by the process of claim 5.

9. A foundry core obtained by the process of claim 6.

10. A foundry core obtained by the process of claim 7.

References Cited

UNITED STATES PATENTS

| | | | |
|---|---|---|---|
| 2,714,098 | 7/1955 | Martin | 260—59 |
| 2,846,742 | 8/1958 | Wagner | 22—164 |
| 3,145,438 | 8/1964 | Kottke, et al. | 22—193 |

FOREIGN PATENTS

| | | |
|---|---|---|
| 1,002,440 | 8/1965 | Great Britain. |

MORRIS LIEBMAN, *Primary Examiner.*

J. E. CALLAGHAN, *Assistant Examiner.*